United States Patent [19]

Miyazaki

[11] 3,789,162

[45] Jan. 29, 1974

[54] TWO-FOUR CHANNEL CHANGEOVER CIRCUIT FOR A CARTRIDGE-TYPE TAPE PLAYER

[76] Inventor: Toru Miyazaki, 15-3 Aza Sakumae, Okaona, Onahama, Iwaki, Japan

[22] Filed: June 29, 1972

[21] Appl. No.: 267,563

[30] Foreign Application Priority Data

Aug. 13, 1971 Japan ............................... 46-72482

[52] U.S. Cl. ......................... 179/100.2 CA, 274/4 G
[51] Int. Cl. ............................................. G11b 5/54
[58] Field of Search ........... 179/100.2 CA, 100.2 Z; 274/4 G

[56] References Cited

UNITED STATES PATENTS

| | | | |
|---|---|---|---|
| 3,548,114 | 12/1970 | Fish et al. | 179/100.2 CA |
| 3,278,694 | 10/1966 | Pastor et al. | 179/100.2 CA |
| 3,420,965 | 1/1969 | Townsend et al. | 179/100.2 CA |
| 3,484,110 | 12/1969 | Takemi et al. | 179/100.2 Z X |
| 3,507,501 | 4/1970 | Lear | 179/100.2 Z X |
| 3,531,126 | 9/1970 | Tsukagoshi et al. | 179/100.2 CA X |
| 3,532,347 | 10/1970 | Parsons | 274/4 G |
| 3,552,751 | 1/1971 | Kelso | 179/100.2 CA X |
| 3,583,708 | 6/1971 | Prager | 179/100.2 CA X |
| 3,640,538 | 2/1971 | Tolar | 179/100.2 CA X |
| 3,656,761 | 4/1972 | Laschenski | 179/100.2 CA X |

*Primary Examiner*—Paul J. Henon
*Assistant Examiner*—Melvin B. Chapnick
*Attorney, Agent, or Firm*—Mueller, Aichele & Gillman

[57] ABSTRACT

A two-four channel tape player including circuitry for switching the mode of operation thereof in accordance with a cartridge received in the player includes four amplifier circuits, each coupled to a magnetic pick-up of a four-channel magnetic tape head and to a corresponding speaker. Each amplifier circuit is coupled to a rotary switch through a two-four channel mode selecting switch. The rotary switch is rotatable and operable to two conditions in response to the rotation of a tape head indexing cam of the player. Diodes coupled to the amplifier circuits are forward biased to couple the last-mentioned amplifier circuits to respective speakers upon insertion of a four-channel cartridge into the player. For a two-channel cartridge, only two of the four pick-ups of the tape head and corresponding amplifier circuits are employed. The amplified output of a first one of the operational channels is reproduced at a first pair of speakers and the amplified output of the second operational channel is reproduced at the other pair of speakers. Resistive networks coupled between a potential source and the output of the diodes are provided. The resistive networks provide the biasing potential required at the cathodes of the diodes for forward and/or reverse biasing thereof in accordance with the type of cartridge inserted into the player for passing and/or blocking signals from respective amplifier circuits.

6 Claims, 2 Drawing Figures

TWO-FOUR CHANNEL CHANGEOVER CIRCUIT FOR A CARTRIDGE-TYPE TAPE PLAYER

BACKGROUND

This invention relates to switching circuitry for use in a cartridge-type tape player for operating the player in a four or two channel mode of operation.

With the advent of four-channel sound, it became necessary to provide tape player devices for reproducing sound recorded on four-channel tapes. Such devices should, however, be designed not only for playing back four-channel tapes, but for playing two-channel or stereophonic tapes as well. Also, it is desirable that these tape playing devices be equipped with proper sound reproduction circuitry including sound amplifiers and the like which are operated automatically to a four or two channel mode in accordance with the type of tape cartridge received in the device, thereby eliminating the need for manual operation to the desired mode.

Tape devices of the above type are known in the art, see pending U.S. Pat. applications, Ser. No. 243,006 filed Apr. 11, 1972 and Ser. No. 253,780 filed May 16, 1972, both in the name of Yoshiro Mizumoto and assigned to the same assignee as the instant application.

SUMMARY

It is an object of the present invention to provide a new and improved tape playing device for playing both four and two channel tape cartridges which includes circuitry for switching the mode of operation thereof in accordance with the type of cartridge received in the device.

It is a further object of the present invention to provide a tape player device of the above described type which includes sound amplification circuitry which is operable automatically to a four or two channel mode in accordance with the type of tape cartridge received in the device.

Briefly, a preferred embodiment of the two-four channel tape playing device according to the invention comprises circuitry including four amplifier arrangements each coupled electrically to a magnetic pick-up portion of a four-channel magnetic tape head and to a corresponding speaker or sound reproducing element. Each of the amplifier arrangements is also connected to a rotary switch through a two-four channel mode selecting switch operated to one of two positions, i.e., two or four channel setting, in accordance with the receipt of a two or four channel cartridge in the player, respectively. The rotary switch is rotatable with a tape head indexing cam operable to move the tape head to upper and lower positions with respect to the magnetic tape in the cartridge inserted into the player.

Upon insertion of a four-channel cartridge into the player, diodes coupled to each of the amplifier arrangements are forward biased to couple the last-mentioned arrangements to respective speakers.

In the event a two-channel cartridge is received in the player, only two of the pick-up areas of the tape head are employed, thus, only those corresponding amplifier arrangements are operated. In the latter case, the amplified output of a first one of the two operational channels is reproduced at a first pair of speakers and the output from the other channel is reproduced at a second pair of speakers.

To operate the amplifier arrangements, resistive networks are provided. The networks are coupled to a source of bias potential and to the aforementioned rotary switch and the output of the above described diodes. In the case of a four-channel channel cartridge, the resistive networks pass B+ from the source of potential to ground and therefore make the output or control terminal of the diodes negative with respect to the inputs for forward biasing of the diodes. In the case of a two-channel cartridge, when the tape head is in a first position, the rotary switch wiper which is connected to the resistive networks, is coupled to ground potential to forward bias two of the diodes as described, for passing signals from respective amplifier arrangements. The remaining two diodes are reverse biased due to a greater potential being applied by the resistive networks at the outputs thereof than at the inputs. The reverse biased diodes serve to block signals from respective amplifier arrangements. The two amplifier arrangements which are rendered operable as described heretofore, are selected in accordance with the positioning of the wiper of the rotary switch coupled to the tape head indexing cam. Thus, when the tape head is moved to the second position, the two previously reverse biased diodes are forward biased to pass signals from respective amplifier arrangements and the previously forward biased diodes are reverse biased to block signals emanating from corresponding amplifier arrangements.

DETAILED DESCRIPTION

The present invention will become more apparent from the following detailed description of the exemplary embodiment shown in the accompanying drawing.

Figure 1:
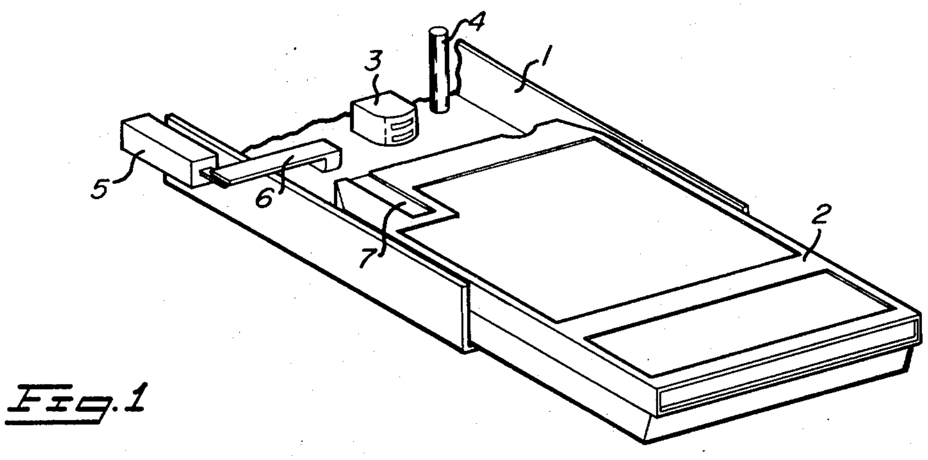
FIG. 1 is a perspective view of a portion of a cartridge tape player incorporating two-four channel switching circuitry according to the invention.

Referring now to FIG. 1 of the drawing, reference numeral 1 designates a cartridge type tape player embodying the switching circuitry according to the invention. Reference numeral 2 denotes a multi-channel, endless tape cartridge which is received in the tape player unit for playing back information recorded on the tape therein. Reference numeral 3 illustrates a magnetic transducer or tape head which is capable of reproducing four discrete signals simultaneously. The magnetic tape head 3 is so mounted on the player unit as to be changed in elevation to two different levels with respect to the channels on the tape within tape cartridge 2. The tape head is moved between the two positions by means of a cam device (not shown) in the well known manner. Reference numeral 4 illustrates a capstan shaft to drive the tape through the cartridge. Reference numeral 6 illustrates a lever for actuating a changeover switch 5 upon insertion of a two-channel tape cartridge into the tape player. Switch 5 remains unactuated however when a four-channel tape cartridge including a slot 7 therein is inserted into the player. The slot 7 permits insertion of the cartridge without engagement of the lever 6.

Figure 2:
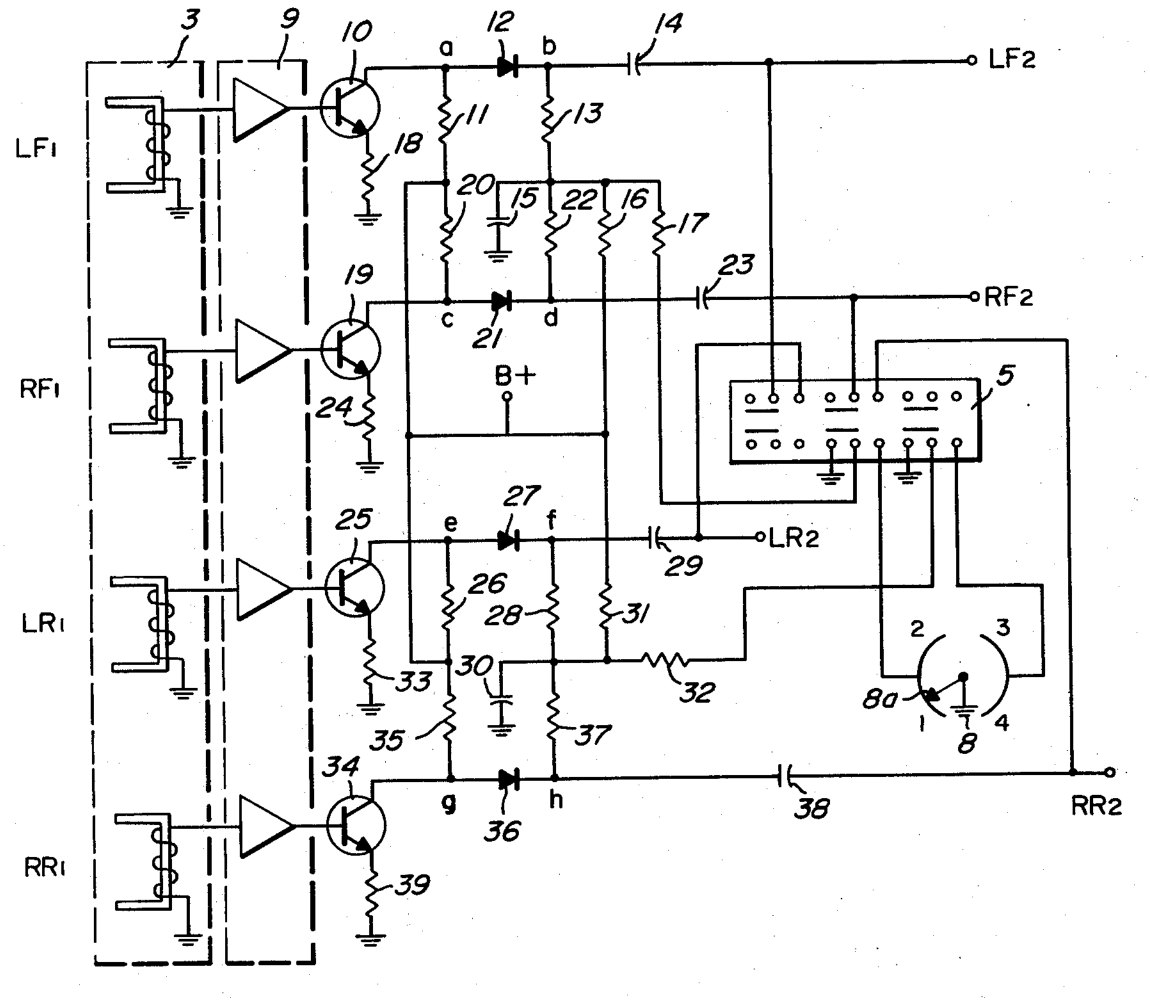
FIG. 2 is a schematic diagram of the switching circuitry according to the invention.

Referring now to FIG. 2 of the drawing, the magnetic transducer or tape head 3 is composed of four magnetically separated signals cores or pick-ups (the disposition of the respective head cores is shown in FIG. 1 of the drawing). Reference numeral 8 denotes a panel switch coaxially coupled to the tape head indexing cam mentioned heretofore to adjust the tape head vertically with respect to the tape channels. Reference numeral 9 illustrates first stage amplifiers for amplifying signals from respective tape head cores or pick-ups LF1, RF1, LR1 and RR1 of the magnetic tape head 3.

In the circuit coupled to the pick-up LF1, reference numeral 10 denotes a second stage amplifying transistor, numeral 11 denotes a load resistor for the transistor 10 and numeral 12 illustrates a switching diode. Reference numeral 13 shows a biasing resistor which is selected to be greater in value than the output impedance of the amplifying transistor 10. Reference numerals 14, 15 and 16 denote, respectively, a coupling capacitor, a capacitor for prevention of crosstalk between signals derived at LF1 and RF1, and a rather high ohmic resistor for supplying bias voltage. Reference numeral 17 denotes a resistor which serves to prevent the switching noise of the changeover switch 5 from being heard over the output speakers or elements, which functions in cooperation with capacitor 15. Numeral 18 illustrates an emitter resistor for the amplifying transistor 10. The two-four channel changeover switch 5 is illustrated in greater detail in FIG. 2 showing its contacts and the operation thereof.

In the circuit coupled to pick-up RF1, reference numeral 19 denotes a second stage amplifying transistor and numeral 20 shows a load resistor for the transistor 19. Numeral 21 denotes a switching diode and numeral 22 denotes a biasing resistor which is selected to be greater in value than the output impedance of the amplifying transistor 19.

Reference numerals 23 and 24 denote, respectively, a coupling capacitor and emitter resistor for the amplifying transistor 19.

In the circuit coupled to pick-up LR1, reference numeral 25 illustrates a second stage amplifying transistor, numeral 26 shows a load resistor for the amplifying transistor 25 and numeral 27 denotes a switching diode.

Reference numeral 28 illustrates a biasing resistor which is greater in value than the output impedance of the amplifying transistor 25. Reference numerals 29, 30 and 31 show, respectively, a coupling capacitor, a capacitor for preventing crosstalk between signals derived at pick-ups LR1 and RR1, and a resistor for supplying biasing voltage. Reference numeral 32 illustrates a resistor which eliminates substantially the audible reproduction of the switching noise of switch 5 and operates in co-operation with the capacitor 30. Numeral 33 illustrates an emitter resistor for the amplifying transistor 25.

In the circuit coupled to head core RR1, reference numeral 34 shows a second stage amplifying transistor, numeral 35 shows a load resistor for the transistor 34 and numeral 36 denotes a switching diode. Reference numeral 37 shows a biasing resistor selected to be greater in value than the output impedance of the amplifying transistor 34. Reference numerals 38 and 39 denote, respectively, a coupling capacitor and an emitter resistor for the amplifying transistor 34.

The operation of the panel switch 8 is such that when the magnetic transducer head 3 is positioned at its upper level, the movable contact or wiper 8*a* is brought into engagement with the stationary contact 1, and when the indexing cam is rotated to bring the magnetic head 3 into a lower level position, the movable wiper 8*a* is brought into engagement with stationary contact 2. Similarly, when the magnetic head 3 is returned to an upper level position, the movable wiper 8*a* is brought into engagement with the stationary contact 3 and when the tape head is positioned to a lower level, the movable wiper is brought into engagement with stationary contact 4.

The operation of the circuitry in accordance with the present invention is as follows:

In the event a four-channel tape cartridge, including a slot 7 in the top wall thereof, is inserted into the tape player, movable contacts of the ganged changeover switch 5 remain in the position as shown in FIG. 2.

When the movable contact wiper 8*a* of the panel switch 8 is moved into engagement with stationary contacts 1 or 2 due to the rotation of the tape head indexing cam, bias current will flow from the B+ source through resistors 16 and 17 and through the switch contacts of push switch 5 to ground. In this condition, the potential at point b is negative with respect to the point *a*, and switching diode 12 is placed in a forward biased condition. Thus, signals derived at pick-up LF1 are amplified and appear as output signals at element LF2.

Similarly, since the potential at point d is negative with respect to that at point c, switching diode 21 is forward biased so that signals derived at head core RF1 are amplified and appear as output signals at RF2. Current from the B+ source also flows through resistors 31 and 32 to ground at the contacts of switch 5. Thus, since the potential at point f is negative with respect to the potential at point *e*, switching diode 27 is forward biased, so that signals derived at pick-up LR1 are amplified and appear as output signals at element LR2. Similarly, since the potential at point h is negative with respect to the potential at point g, switching diode 36 is also forward biased. Thus, signals derived at pick-up RR1 are amplified and appear at the output element RR2.

Movement of the wiper 8*a* of panel switch 8 into engagement with stationary contacts 3 or 4 as the case may be, does not affect the operation of the circuitry. Signals derived at LF1, RF1, LR1 and RR1 continue to be amplified by corresponding amplifier circuitry and appear as output signals at elements LF2, RF2, LR2 and RR2, respectively.

In the case where a two-channel tape cartridge is loaded into the tape player, lever 6 (shown in FIG. 1) is engaged thereby to operate changeover switch 5, moving the contacts thereof as seen in FIG. 2 to the two-channel position (to the right as illustrated in FIG. 2).

In the latter condition, when the movable wiper 8a of panel switch 8 is positioned in engagement with the stationary contacts 1 or 2, current from the B+ source flows through resistors 16 and 17, respective contacts of switch 5 and the panel switch 8 to ground. In this case, the potential at point b is negative with respect to the potential at point *a*, and switching diode 12 is therefore forward biased. Thus, signals from LF1 are amplified and appear as output signals at element LF2.

In the circuit coupled to pick-up LR1, current from the B+ source flows through resistor 31 and resistor 28 to apply at point *f* a potential which is positive with respect to that at point *e*. Thus, switching diode 27 is reverse biased and signals derived at pick-up LR1 are blocked and do not appear at point *f*. Because of the circuit connection through switch 5, however, the amplified signals from pick-up LF1 pass to the output element LR2.

Similarly, since the switching diode 21 is forward biased, signals from RF1 are amplified and appear at output element RF2. The signaly from pick-up RR1, however, are blocked by the reverse biased diode 36, but because of the interconnections through switch 5, signals from pick-up RF1 which have been amplified also appear at output element RR2.

Upon movement of the panel switch wiper 8*a* into engagement with stationary contact 3 or 4 of the panel switch, current from the B+ source flows through resistors 31 and 32, the switch 5 and the panel switch to ground. Therefore, the potential at points *e* and *g* are positive with respect to the potential at points *f* and *h*, respectively, thereby causing switching diodes 27 and 36 to be forward biased. In the latter case, signals derived at LR1 and RR1 are amplified and appear at the outputs LR2 and RR2, respectively.

Because the stationary contacts 1 and 2 of the panel switch 8 are opened, i.e., not engaged by wiper 8*a*, the current from the B+ source flows through resistor 16 and resistors 13 and 22 causing the potential at points *b* and *d* to be positive with respect to that at points *a* and *c*, respectively. Thus, switching diodes 12 and 21 are reverse biased. In this instance, signals derived at LF1 and RF1 are blocked from respective output elements LF2 and RF2. The signals derived at LR1 however, are amplified and appear as output signals both at LR2 and LF2, while the signals from head core RR1 are amplified and appear as output signals both at element RR2 and RF2.

To summarize the foregoing, when a four-channel tape cartridge is received in the tape player 1, signals from LF1, RF1, LR1 and RR1 are amplified and appear as output signals at LF2, RF2, LR2 and RR2, respectively. Upon insertion of a two-channel tape cartridge into the tape player, signals from LF1 appear both at LR2 and LF2 and signals derived at RF1 appear both at RF2 and RR2 when the movable contact of the panel switch 8 is engaged with stationary contacts 1 or 2. If the movable contact wiper 8*a* is positioned for engagement with the stationary contacts 3 or 4, signals derived at pick-up LR1 are amplified by corresponding amplification circuitry and appear as output signals at LR2 and LF2, and signals derived at RR1 will be amplified by corresponding amplification circuitry and appear both at RR2 and RF2.

The two-four channel changeover circuitry of the cartridge tape player according to the invention provides an automatic means for changing the amplification circuitry of the player to a two or four channel condition in accordance with the type of tape cartridge inserted into the player. Since the switching action of the two-four channel circuitry is accomplished through the use of a diode, changeover is rapid and reliable.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. A cartridge-type tape player adapted to receive and play two and four channel tape cartridges, said player including in combination:

magnetic tape head means having four pick-up areas, said tape head means being movable between two positions to align said pick-up areas with various ones of said channels on said tape, amplifier means including four amplifier circuits, each connected electrically to one of said pick-up areas of said tape head, four audio output means for receiving signals from said amplifier circuits for audible reproduction thereof, switching means coupled to said amplifier circuits and movable between first and second positions in accordance with the receipt of a four or two channel tape cartridge in said player, respectively, first and second pairs of electronic switch means each operable to an off and on condition and each having a control terminal, each of said switch means being interposed between the output of a corresponding one of said amplifier circuits and one of said four output means for passing signals therebetween, bias potential means for providing a control potential, voltage divider means coupled to said control terminals of said electronic switch means, to said bias potential means and to said switching means, said switching means in said first position connecting said voltage divider means to apply a predetermined portion of said control potential to said control terminals of said electronic switch means to operate the latter to an on condition for passing signals received and amplified at respective pick-up areas and amplifier circuits to corresponding output means while maintaining said signals separated from each other,and said switching means in said second position connecting said voltage divider means to apply said predetermined portion of said control potential to said control terminals of a predetermined pair of said electronic switch means to operate the latter to an on condition for passing signals received and amplified at respective pick-up areas and amplifier circuits to a corresponding pair of output means while maintaining said respective signals separated from each other, and said voltage divider means applying said control potential to said control terminals of said other pair of electronic switch means to operate the latter to an off condition for blocking signals received at respective pick-up areas, said predetermined pair of electronic switch means being selected in accordance with the position of said magnetic tape head means.

2. A cartridge-type tape player as claimed in claim 1 wherein said voltage divider means comprises resistive net-work means interposed electrically between said control terminals of respective ones of said electronic switch means, said bias potential means and said switching means.

3. A cartridge-type tape player as claimed in claim 2 wherein said resistive network means includes a pair of resistive networks, each of which is coupled to said control terminals of one of said pairs of said electronic switch means, to said bias potential means and said switching means, and wherein said switching means includes a plurality of switch terminals, with said switching means in said first position, said switch terminals being connected in a first manner to a ground potential whereby both said resistive networks operate in voltage divider fashion to apply said pre-determined portion of said control potential to the control terminals of corresponding electronic switch means and with said switching means in said second position said switch terminals are connected in a second manner to connect selective ones of said terminals to ground potential whereby one of said two resistive networks is operated in voltage divider fashion to apply said predetermined portion of said control potential to the control terminals of corresponding electronic switch means coupled thereto, said other one of said resistive networks being operated to apply the control potential to the control terminals of corresponding electronic switch means coupled thereto.

4. A cartridge-type tape player as claimed in claim 3 further including tape head indexing means for moving said magnetic tape head means to one of said two positions with respect to said tape for aligning said pick-up areas with predetermined tape channels thereon and wherein said switching means is movable in accordance with the movement of said tape head means, with said switching means in the second position said first resistive network being operated in voltage divider fashion upon said tape head means being moved to one of said two positions and the second resistive network being operated in voltage divider fashion upon moving said tape head means to the other of said two positions.

5. A cartridge-type tape player as claimed in claim 4 wherein each said electronic switch means includes a diode having an anode and cathode and wherein said cathode comprises the control terminal thereof.

6. A cartridge-type tape player according to claim 1 wherein said switching means includes contacts connected between said pairs of output means, said contacts in said second position connecting said pairs of output means whereby said signals passed by said predetermined pair of switch means are applied to all said output means.

* * * * *

UNITED STATES PATENT OFFICE
CERTIFICATE OF CORRECTION

Patent No. 3,789,162 Dated January 29, 1974

Inventor(s) Toru Miyazaki

It is certified that error appears in the above-identified patent and that said Letters Patent are hereby corrected as shown below:

On the Title Page, the following should be added:

-- [73] Assignee: Alps Motorola, Inc., Tokyo, Japan --.

Signed and sealed this 3rd day of September 1974.

(SEAL)
Attest:

McCOY M. GIBSON, JR.
Attesting Officer

C. MARSHALL DANN
Commissioner of Patents